United States Patent
Lv et al.

(10) Patent No.: US 10,591,920 B2
(45) Date of Patent: Mar. 17, 2020

(54) HOLISTIC PLANNING WITH MULTIPLE INTENTIONS FOR SELF-DRIVING CARS

(71) Applicant: QUALCOMM Incorporated, San Diego, CA (US)

(72) Inventors: Zhaoyang Lv, Smyrna, GA (US); Aliakbar Aghamohammadi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 309 days.

(21) Appl. No.: 15/604,437

(22) Filed: May 24, 2017

(65) Prior Publication Data

US 2018/0341269 A1    Nov. 29, 2018

(51) Int. Cl.
| | |
|---|---|
| *G06F 17/00* | (2019.01) |
| *G05D 1/02* | (2020.01) |
| *G01C 21/34* | (2006.01) |
| *G08G 1/16* | (2006.01) |

(52) U.S. Cl.
CPC ....... *G05D 1/0217* (2013.01); *G01C 21/3407* (2013.01); *G01C 21/3453* (2013.01); *G05D 2201/0213* (2013.01); *G08G 1/161* (2013.01); *G08G 1/167* (2013.01)

(58) Field of Classification Search
CPC .. G05D 1/0217; G05D 1/0214; G05D 1/0289; G05D 1/0088; G05D 1/0246; G05D 2201/0213; G01C 21/3453; G08G 1/167; G08G 1/161
USPC .............................. 701/1, 3, 23, 469; 706/52
See application file for complete search history.

(56) References Cited

U.S. PATENT DOCUMENTS

| | | | | |
|---|---|---|---|---|
| 9,227,632 | B1* | 1/2016 | Lee | B60W 30/0953 |
| 9,933,781 | B1* | 4/2018 | Bando | B60W 10/18 |
| 2012/0083947 | A1* | 4/2012 | Anderson | B60W 30/09 |
| | | | | 701/3 |
| 2014/0195093 | A1* | 7/2014 | Litkouhi | B62D 15/0255 |
| | | | | 701/23 |
| 2014/0244096 | A1* | 8/2014 | An | G05D 1/0055 |
| | | | | 701/25 |
| 2015/0345967 | A1* | 12/2015 | Meuleau | G01C 21/3453 |
| | | | | 701/25 |
| 2016/0098496 | A1* | 4/2016 | Joshi | E01C 1/02 |
| | | | | 703/1 |
| 2017/0315556 | A1* | 11/2017 | Mimura | G08G 1/096725 |
| 2017/0336515 | A1* | 11/2017 | Hosoya | G01S 19/40 |
| 2018/0201272 | A1* | 7/2018 | Takeda | B60W 30/10 |
| 2018/0261093 | A1* | 9/2018 | Xu | B60W 10/20 |
| 2018/0284785 | A1* | 10/2018 | Berntorp | G05D 1/0214 |

FOREIGN PATENT DOCUMENTS

DE    102012007127 A1    3/2013

\* cited by examiner

*Primary Examiner* — Shardul D Patel
(74) *Attorney, Agent, or Firm* — Kilpatrick Townsend & Stockton, LLP

(57) ABSTRACT

Aspects of the disclosure are related to a method, apparatus and system for joint motion planning and trajectory estimation, comprising: determining a cost function to describe system kinematics comprising trajectories, speeds, and accelerations of a host vehicle and of one or more other vehicles for each possible intention of the host vehicle and of the other vehicles, wherein the trajectories are described with spline functions; and determining jointly the trajectories of the host vehicle and of the other vehicles.

22 Claims, 7 Drawing Sheets

HOLISTIC PLANNING WITH MULTIPLE INTENTIONS FOR SELF-DRIVING CARS

FIELD

The subject matter disclosed herein relates to electronic devices and automotive vehicles, and more particularly to methods, apparatuses, and systems for planning a trajectory for an autonomous vehicle.

BACKGROUNDS

An autonomous vehicle may need to plan a safe trajectory for itself based on its environment. The problem may be referred to as motion planning, and the vehicle doing the planning may be referred to as the host vehicle. In order to avoid collision, the host vehicle may need to estimate the other vehicles' current position as well as predict their future intentions or trajectories. At the same time, the host vehicle may also be traveling at a high speed (e.g., 25-30 m/s) itself. Therefore, motion planning may require taking into account the complex environment as well as the goal of the host vehicle (e.g., the host vehicle may need to take the next highway exit).

Further, in addition to collision avoidance, there may be other desired objectives in the motion planning problem. For example, preferably passenger comfort should be taken into consideration when planning the motion of the host vehicle.

SUMMARY

One aspect of the disclosure is directed to a method for joint motion planning and trajectory estimation, comprising: determining a cost function to model possible intentions and trajectories of a host vehicle and one or more other vehicles; determining spline functions to describe 1) a trajectory, 2) speed, and 3) acceleration for each possible intention of the host vehicle and the other vehicles; and determining jointly the trajectory of the host vehicle and of the other vehicles.

DETAILED DESCRIPTION

Figure 1:
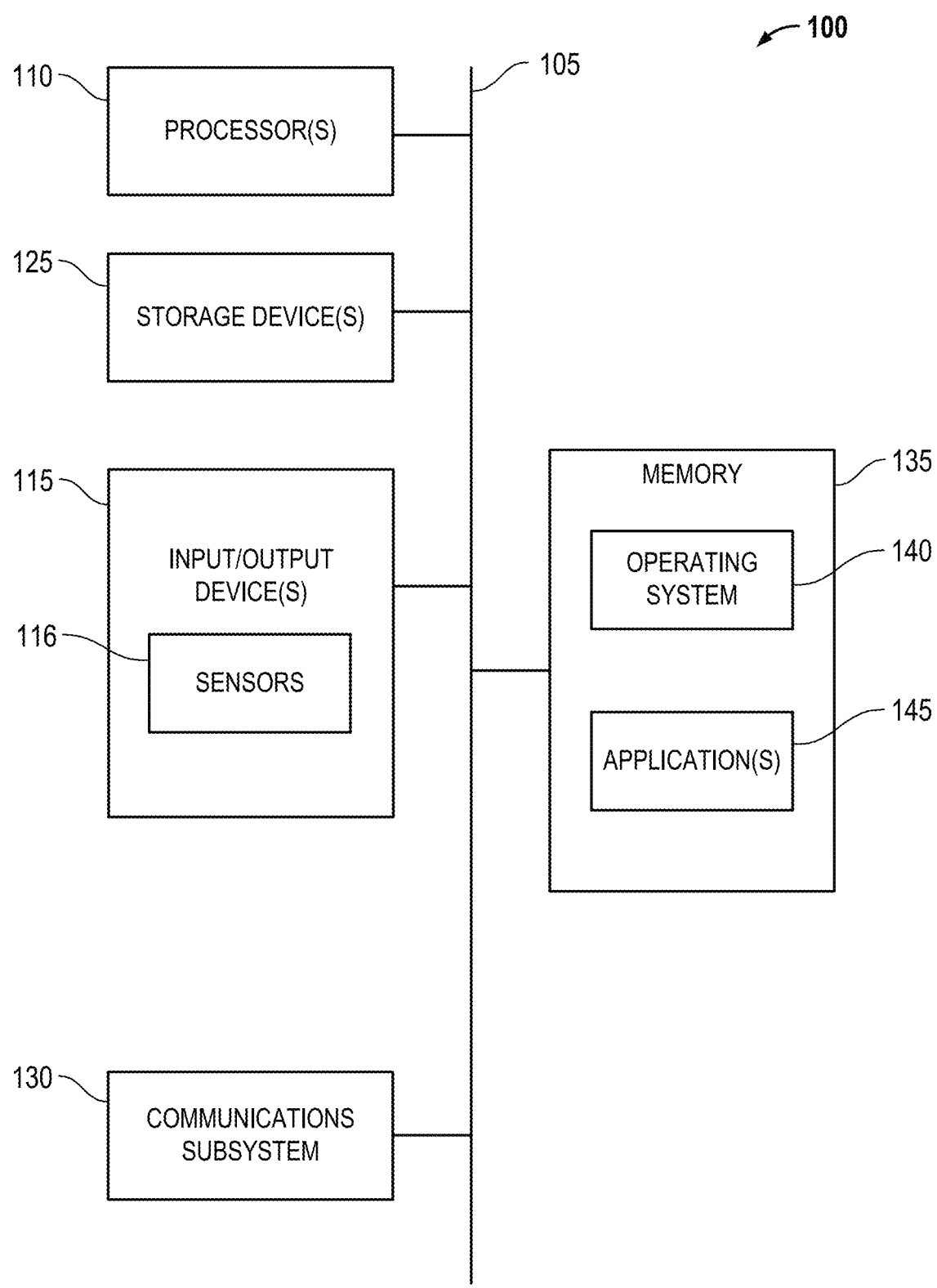
FIG. 1 is a block diagram illustrating an example onboard system installed in an automotive vehicle and adapted for planning a trajectory for the automotive vehicle.

Referring to FIG. 1, an example onboard system 100 installed in an automotive vehicle and adapted for jointly planning a trajectory for the automotive vehicle and estimating the intentions and trajectories of other vehicles in the environment, according to one embodiment of the disclosure, is shown. The automotive vehicle may be a non-autonomous, semi-autonomous (e.g., semi-self-driving), or autonomous (e.g., self-driving) vehicle. The onboard system 100 is shown comprising hardware elements that can be electrically coupled via a bus 105 (or may otherwise be in communication, as appropriate). The hardware elements may include one or more processors 110, including without limitation one or more general-purpose processors and/or one or more special-purpose processors (such as digital signal processing chips, graphics acceleration processors, and/or the like); one or more input/output devices 115 comprising one or more sensors 116, as well as a mouse, a keyboard, a display, a speaker, and/or the like. The sensors 116 may comprise a proximity sensor, a camera, etc. The sensors 116 may further comprise one or more of: a gyroscope, an accelerometer, a magnetometer, or any combination thereof.

The onboard system 100 may further include (and/or be in communication with) one or more non-transitory storage devices 125, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including without limitation, various file systems, database structures, and/or the like.

The onboard system 100 might also include a communication subsystem 130, which can include without limitation a modem, a network card (wireless or wired), an infrared communication device, a wireless communication device and/or chipset (such as a Bluetooth device, an 802.11 device, a Wi-Fi device, a WiMAX device, cellular communication facilities, etc.), and/or the like. The communications subsystem 130 may permit data to be exchanged with a network, other computer systems/devices, and/or any other devices described herein. In many embodiments, the onboard system 100 will further comprise a working memory 135, which can include a RAM or ROM device, as described above.

The onboard system 100 also can comprise software elements, shown as being currently located within the working memory 135, including an operating system 140, device drivers, executable libraries, and/or other code, such as one or more application programs 145, which may comprise or may be designed to implement methods, and/or configure systems, provided by other embodiments, as described herein. Merely by way of example, one or more procedures described with respect to the method(s) discussed below might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 125 described above. In some cases, the storage medium might be incorporated within a computer device, such as the onboard system 100. In other embodiments, the storage medium might be separate from a computer device (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the onboard system 100 and/or might take the form of source and/or installable code, which, upon compilation and/or installation on the onboard system 100 (e.g., using any of a variety of generally available compilers, installation programs, compression/decompression utilities, etc.), then takes the form of executable code.

In one embodiment, it may be assumed that each observed vehicle has one of the three possible intentions: keeping moving forward in the current lane, switching to the left lane, or switching to the right lane. Each possible intention may be associated with a probability. In one embodiment, it may be assumed that an observed vehicle may accomplish a lane switching in three steps: 1) changing the speed (either acceleration or deceleration) while continuing to travel in the current lane (e.g., in a straight line trajectory parallel to the road topology), 2) switching into the new lane at a constant forward speed, and 3) changing the speed (either acceleration or deceleration) after having switched into the new lane (e.g., in a straight line trajectory parallel to the road topology). The step of switching into the new lane at a constant forward speed may be modeled with a 3rd order polynomial. Therefore, the trajectory associated with each possible intention may be modeled with a cubic spline, and for intentions involving lane switching, each segment of the spline may correspond to one of the steps described above.

The future intention of an observed vehicle may be estimated probabilistically based on various factors. These factors may include direct measurements indicative of the future intention (e.g., a left/right turn signal may indicate an intention to switch into the lane to the left/right), indirect measurements indicative of the future intention (e.g., an estimated trajectory corresponding to a lane change to the left/right), or prior knowledge (e.g., road constraints such as a road sign directing vehicles to a particular direction).

Embodiments of the disclosure are related to a method, apparatus, and system for jointly planning a trajectory of an autonomous vehicle and predicting probabilistically trajectories of one or more nearby vehicles. The planned trajectory may be used to generate control signals that drive the autonomous vehicle and cause the same to move along the planned trajectory. The autonomous vehicle for which the trajectory is planned may also be referred to hereinafter as the host vehicle. All other vehicles that can be sensed by one or more of the sensors of the host vehicle may be considered in the vicinity of the host vehicle. The vehicles in the vicinity of the host vehicle may be autonomous vehicles or human-driven vehicles.

It should be appreciated that the trajectory a vehicle may take depends on the "intention" of the vehicle, which may be based at least in part on the perceived or estimated intentions of other vehicles in its vicinity. Therefore, the trajectory of the host vehicle may be planned based on the position of other vehicles in the vicinity and the predicted trajectories of the other vehicles.

Figure 2:
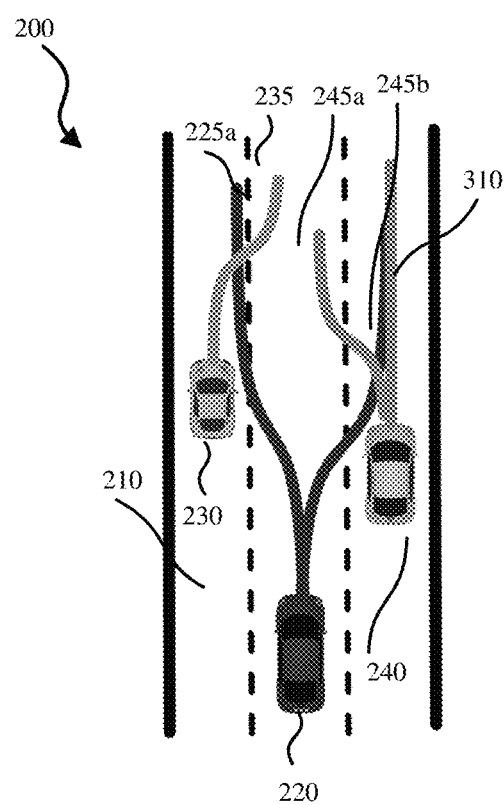
FIG. 2 is a diagram illustrating an example road environment.

Referring to FIG. 2, a diagram illustrating an example road environment 200 is shown. Three vehicles 220, 230, and 240 on a road 210 are shown. Each vehicle 220, 230, 240 may be associated with one or more possible trajectories, each possible trajectory corresponding to a possible "intention." For example, vehicle 220 has two possible trajectories 225a and 225b; vehicle 230 has one possible trajectory 235; and vehicle 240 has two possible trajectories 245a and 245b. It should be appreciated that the trajectory a vehicle actually takes depends in part on the perceived "intentions" of other vehicles in the vicinity that can potentially interfere with the movement of the vehicle.

Holistic Representation

Various symbols used hereinafter are described as follows. At time k during a relative time horizon k∈[0,T],
$X^e(0:T)$ is the state of the host vehicle from time 0 to time T; $X_i^o(0:T)$ is the state of the ith vehicle from time 0 to time T. From time 0 to time T, the intention of the ith vehicle is $I_i$. A set of unknowns therefore may be described as:

$$\Theta = (X^e(0:T), X_1^o(0:T), \ldots, X_M^o(0:T), I_1, \ldots, I_M)$$

where M is the number of vehicles observed at time k∈[0,T].

Given prior information about the road R and measurement vector Z, the unknowns Θ may be estimated as Maximum-a-Posteriori (MAP) from a joint probability density function as:

$$\Theta^* = \operatorname{argmax}_\Theta \{P(\Theta|R,Z)\}$$

where argmax stands for argument for the maximum.

A First Dependency Decomposition

A joint probability density function may have a very high dimensionality, and therefore its solution may be computationally intractable. Therefore, to reduce the dimensionality and complexity of the joint probability density function, in one embodiment, it may be assumed that the trajectory and intention of a vehicle are affected by its fixed-numbered nearest neighboring vehicles (e.g., 3 nearest neighboring vehicles, 4 nearest neighboring vehicles, etc.). Under this assumption, the modified joint probability density function with reduced complexity may be represented as:

$$(\Theta|R, Z) = P(X^e(0:T)|X_{1:M}^o(0:T), I_{1:M}) \prod_{i=1}^M P(X_i^o(0:T), I_i | NN_i^k(X_{1:M}^o(0:T), I_{1:M}))$$

where the function $NN_{irk}(\cdot)$ denotes the K-Nearest-Neighbors of the ith vehicle.

A Second Dependency Decomposition

In another embodiment, it may be assumed that each vehicle in the vicinity of the host vehicle is moving independently from each other. Under this assumption, the modified joint probability density function may be represented as:

$$P(\Theta|R, Z) = P(X^e(0:N)|X_{1:M}^o(0:T), I_{1:M}) \prod_{i=1}^M P(X_i^o(0:T), I_i)$$

Road Model

Various symbols used to describe a road model are described as follows. The spline parameters for the leftmost lane are: $S_R(x,y)=0$. The lanes may be assumed to have an equal width $w_R$. The number of lanes is $N_R$. Therefore, any vehicle may be localized with respect to a lane of the road. For example, for a vehicle with the state X=(x, y, θ) and traveling at the center of the nth lane, the following constraints are satisfied:

$$S_R(x,\hat{y})=0$$

$$\tan(\theta)=\partial S_R(x,\hat{y})/\partial x, \text{ and}$$

$$\hat{y}=y-w_R*(n_R-0.5)$$

Figure 3:
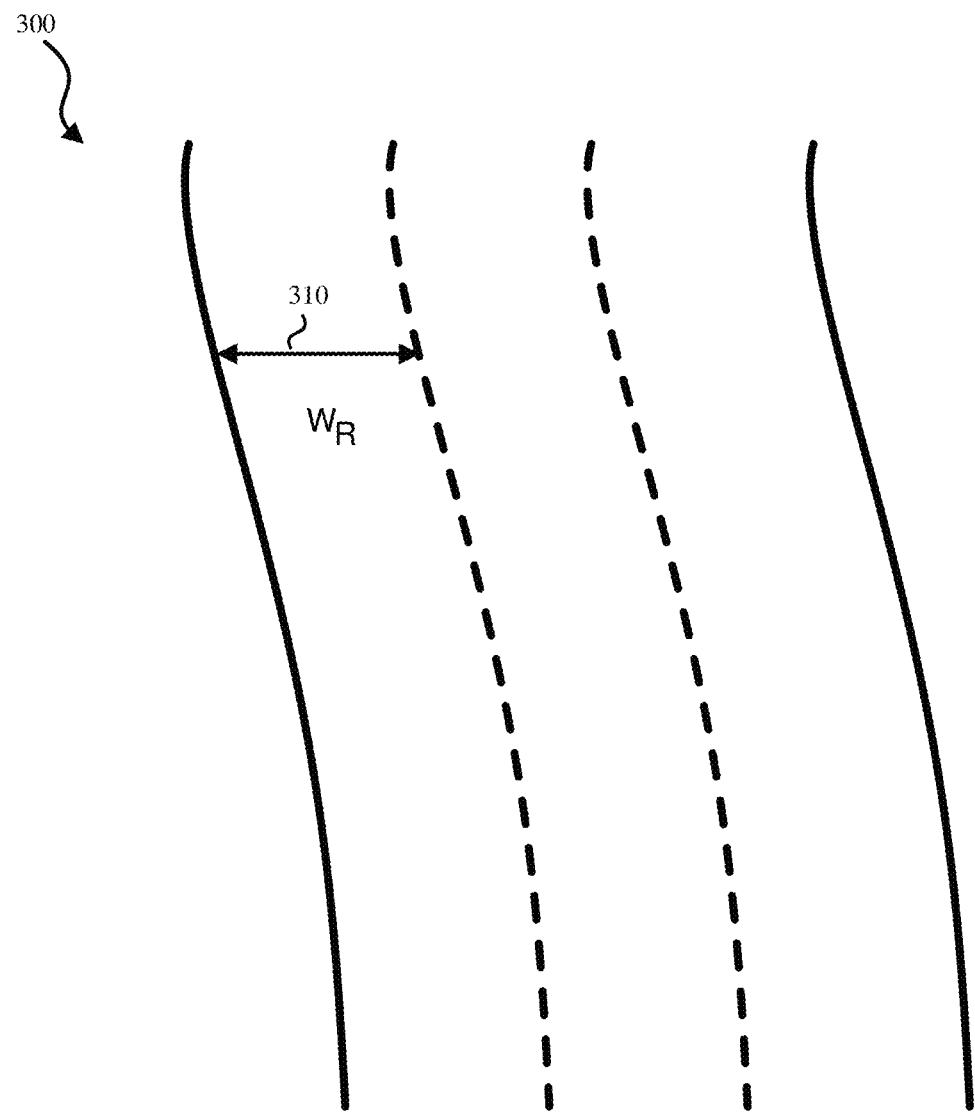
FIG. 3 is a diagram illustrating an example road model.

Referring to FIG. 3, a diagram illustrating an example road model 300 is shown. Three lanes are shown in 300. Therefore, the number of lanes $N_R$ is 3. Further, the width of each lane is $w_R$ 310.

Modeling the Intention and Trajectory

For the item $P(X_i^o(0:N), I_i)$ in the joint probability density function, each vehicle may be assumed to have three possible intentions: 1) stay in lane, 2) change to the left lane, and 3) change to the right lane. Therefore, the trajectory associated with each possible intention may be determined and the probability associated with each intention and its trajectory may be estimated.

Figure 4:
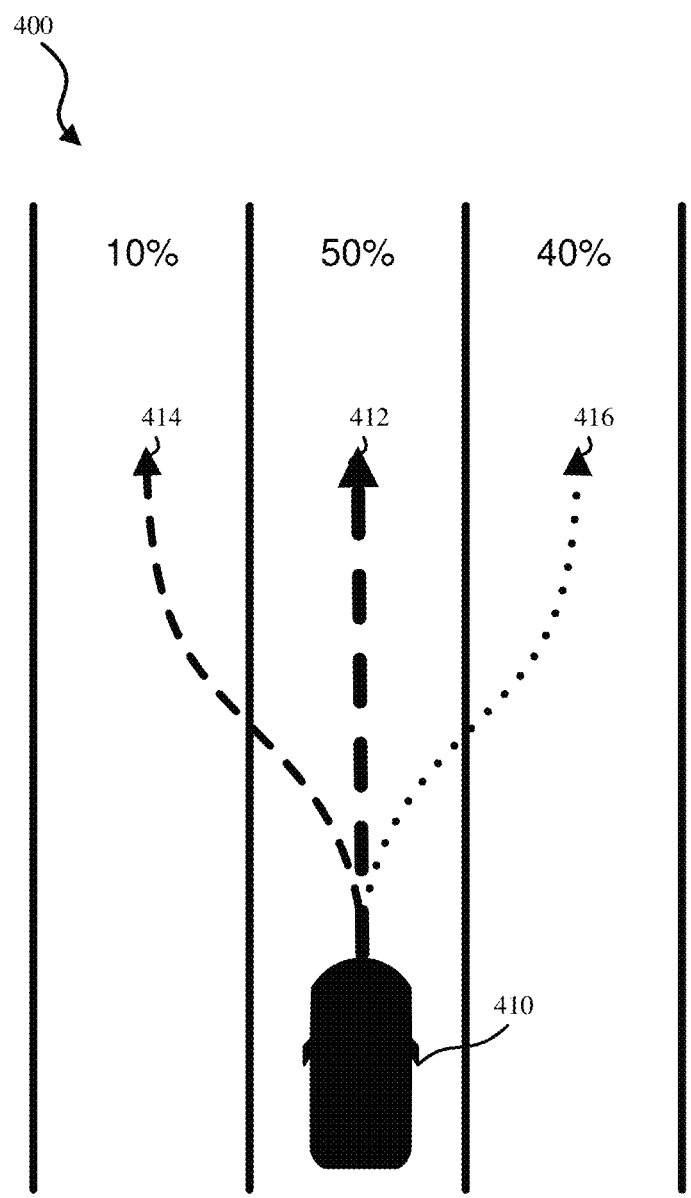
FIG. 4 is a diagram illustrating example intentions and trajectories of a vehicle.

Referring to FIG. 4, a diagram 400 illustrating example intentions and trajectories of a vehicle is shown. As shown, a vehicle 410 may have three possible intentions and associated trajectories: a first possible trajectory 412 is associated with an intention to stay in lane, which is estimated to have a 50% probability; a second possible trajectory 414 is associated with an intention to change to the left lane, which is estimated to have a 10% probability; and a third possible trajectory 416 is associated with an intention to change to the right lane, which is estimated to have a 40% probability.

Effects of Road Constraints on the Trajectory

In one embodiment, the road constraints including the lane width $w_R$ may be taken into consideration in the determination of possible trajectories: $P(X_i^o(0:N), I_i|R)$, where R stands for the road constraints. For each possible intention, an intention state $X^I$ based in part on road constraints may be estimated. Assuming the intention state $X^I$ lies at the center of each lane, the covariance of the trajectory pose in an x-y coordinate system may be an ellipse within the lane width. In one embodiment, the covariance may be represented as $\sigma_{y_i}(R) = w_R/3$.

Figure 5:
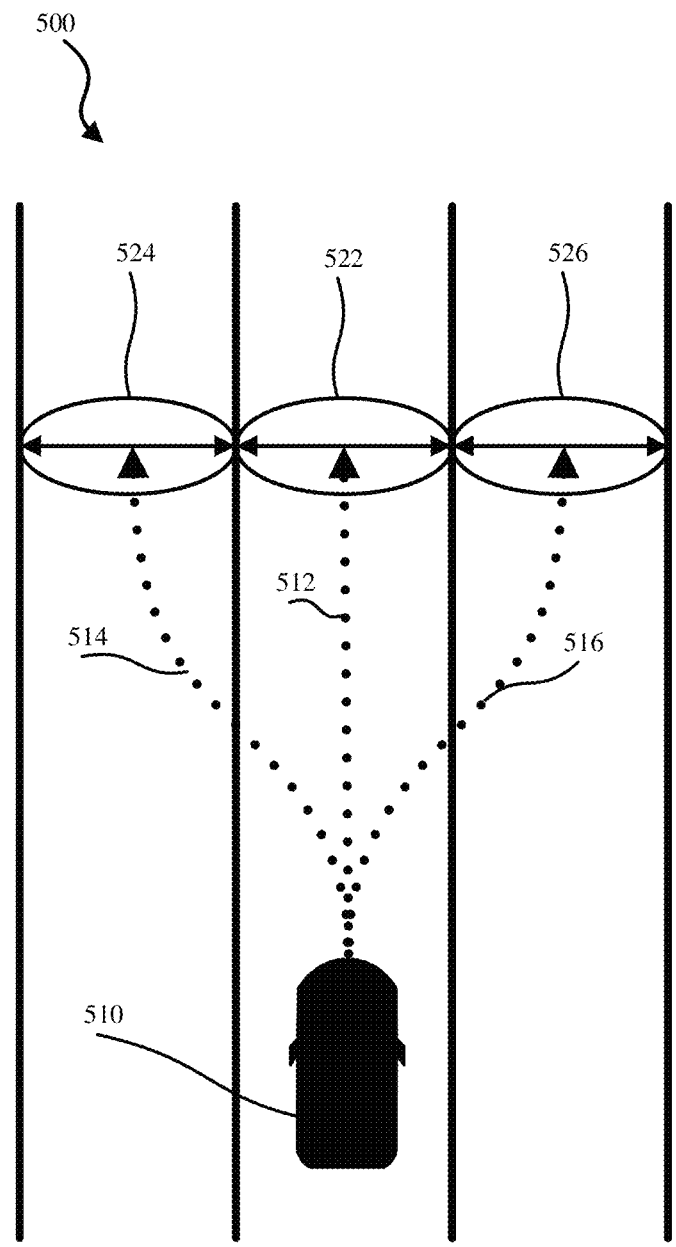
FIG. 5 is a diagram illustrating example intention states based on road constraints.

Referring to FIG. 5, a diagram 500 illustrating example intention states based on road constraints is shown. A vehicle 510 has three possible trajectories 512, 514, and 516. Possible trajectory 512, 514, and 516 are associated with covariances 522, 524, and 526, which are ellipses.

Further, in one embodiment, when determining possible trajectories, it may be assumed that a vehicle do not come too close to lane boundaries when traveling in a lane. For example, it may be assumed that a vehicle stays at least $0.2w_R$ away from lane boundaries. Of course, other boundary distance limits are also possible. The distance limit may be an absolute number or a particular fraction of the road width $w_R$. The distance between a vehicle and a road boundary may be represented as: $d(x; R) = y_i^o - y = y_i^o - (S(x) + N_R w_R)$. Accordingly, a HINGE loss function may be defined as:

$$\xi(x) = \begin{cases} -d(x; R) + \eta_{boundary}, & d(x; R) < \eta_{boundary} \\ 0, & d(x; R) \geq \eta_{boundary} \end{cases}$$

where $\eta_{boundary}$ is the distance limit between the vehicle and a road boundary, and d is distance between a vehicle and a road boundary.

Figure 6:
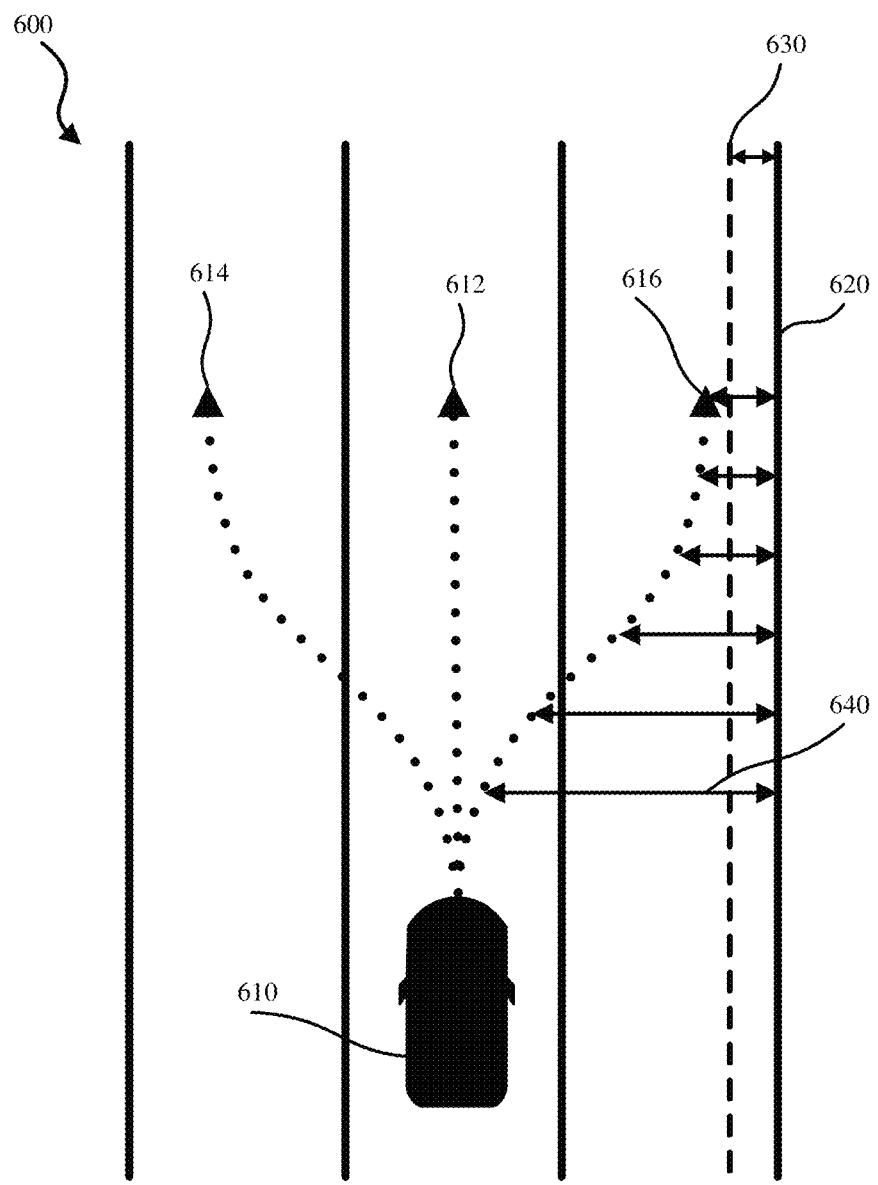
FIG. 6 is a diagram illustrating an example boundary distance limit based on road constraints.

Referring to FIG. 6, a diagram 600 illustrating an example boundary distance limit based on road constraints is shown. A vehicle 610 has three possible trajectories 612, 614, and 616. The boundary distance limit disallows the vehicle 610 from traveling closer to any lane boundary 620 than the boundary distance limit $\eta_{boundary}$ 630. In one embodiment, $\eta_{boundary}$ 630 may be $0.2w_R$. The distances between the vehicle 610 and a lane boundary 620 $d$ 640 at different points on the trajectory corresponding to the intention to change to the right lane are also shown.

Passenger Comfort

A state of a vehicle at a given time t may be estimated based on the spline function describing the trajectory of the vehicle, the speed of the vehicle, and the kinematics of the vehicle:

$$X(t) = \pi(S, V; t)$$

where $\pi(\cdot)$ is kinematics function of the vehicle with the spline constraints taken into consideration.

With the higher order dynamics described above, passenger comfort may be described as a function of a vehicle's velocity and acceleration. It should be appreciated that to improve passenger comfort, the accumulated speed change and steering angle change should be reduced as much as possible.

Therefore, vehicle states may be represented with splines with continuous parameters. The vehicles' geometric trajectories and control variables including speed and acceleration may be in continuous space. The vehicles' acceleration and steering angle may be represented with piecewise smooth functions (e.g., piecewise linear splines). Accordingly, a framework for a method, apparatus, and system for joint motion planning and trajectory estimation that is computationally tractable have been described.

Figure 7:
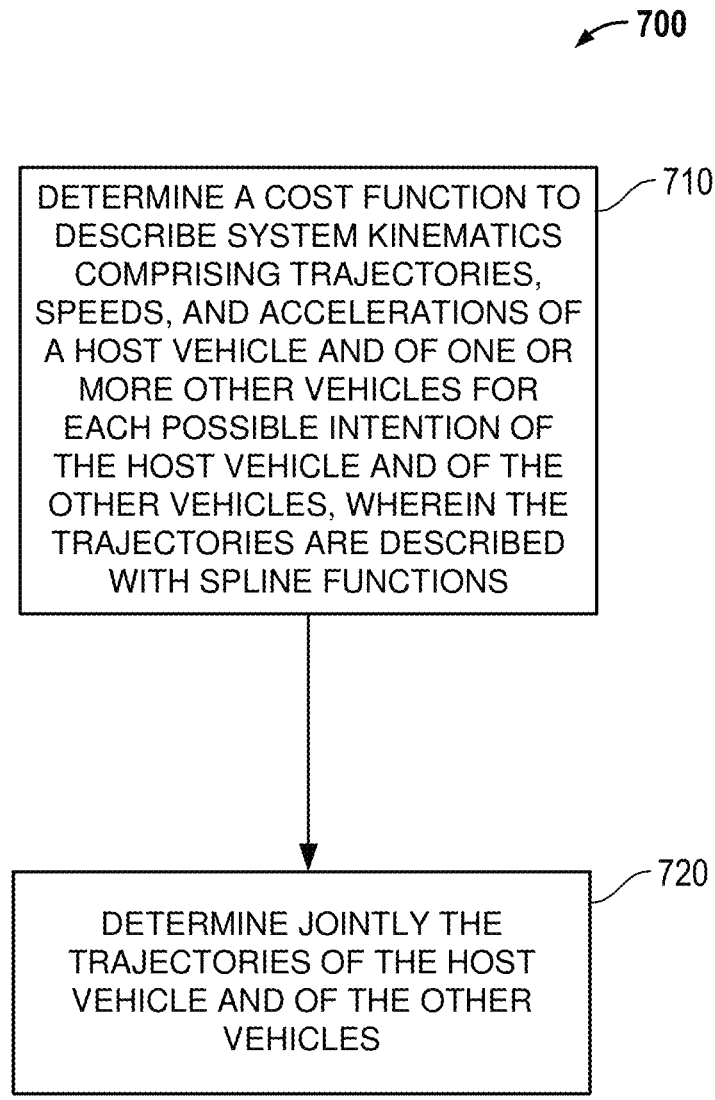
FIG. 7 is a flowchart illustrating an example method for joint motion planning and trajectory estimation.

Referring to FIG. 7, a flowchart illustrating an example method 700 for joint motion planning and trajectory estimation is shown. At block 710, a cost function may be determined to describe system kinematics comprising trajectories, speeds, and accelerations of a host vehicle and of one or more other vehicles for each possible intention of the host vehicle and of the other vehicles, wherein the trajectories may be described with spline functions. At block 720, the trajectories of the host vehicle and of the other vehicles may be jointly determined. The cost function may be based on a vehicle sensor model and/or kinematics. The cost function may be further based on a road model. The road model may impose a boundary distance limit. Control signals for the host vehicle may be generated based on the determined trajectory of the host vehicle. The control signals may minimize accumulated speed change and/or accumulated steering angle change.

One embodiment of the disclosure is directed to a host vehicle apparatus comprising: one or more sensors 116 configured to detect road and vehicle parameters; a memory 135 configured to store code and data; and a processor 110 coupled to the memory 135, the processor 110 configured to: determine a cost function to describe system kinematics comprising trajectories, speeds, and accelerations of the host vehicle and of one or more other vehicles for each possible intention of the host vehicle and of the other vehicles, wherein the trajectories are described with spline functions; and determine jointly the trajectories of the host vehicle and of the other vehicles.

Various implementations of an apparatus, method, and system for adjusting content of a display to help alleviate or prevent motion sickness have been previously described in detail. It should be appreciated that application or system that completes the relevant operations may be implemented as software, firmware, hardware, combinations thereof, etc. In one embodiment, the previous described functions may be implemented by one or more processors (e.g., processor 110) of an onboard system 100 to achieve the previously desired functions (e.g., the method operations of FIG. 7).

Example methods, apparatuses, or articles of manufacture presented herein may be implemented, in whole or in part, for use in or with mobile communication devices. As used herein, "mobile device," "mobile communication device," "hand-held device," "tablets," etc., or the plural form of such terms may be used interchangeably and may refer to any kind of special purpose computing platform or device that may communicate through wireless transmission or receipt of information over suitable communications networks according to one or more communication protocols, and that may from time to time have a position or location that changes. As a way of illustration, special purpose mobile communication devices, may include, for example, cellular telephones, satellite telephones, smart telephones, heat map or radio map generation tools or devices, observed signal parameter generation tools or devices, personal digital assistants (PDAs), laptop computers, personal entertainment systems, e-book readers, tablet personal computers (PC), personal audio or video devices, personal navigation units, wearable devices, or the like. It should be appreciated, however, that these are merely illustrative examples relating to mobile devices that may be utilized to facilitate or support one or more processes or operations described herein.

The methodologies described herein may be implemented in different ways and with different configurations depending upon the particular application. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

The herein described storage media may comprise primary, secondary, and/or tertiary storage media. Primary storage media may include memory such as random access memory and/or read-only memory, for example. Secondary storage media may include mass storage such as a magnetic or solid-state hard drive. Tertiary storage media may include removable storage media such as a magnetic or optical disk, a magnetic tape, a solid-state storage device, etc. In certain implementations, the storage media or portions thereof may be operatively receptive of, or otherwise configurable to couple to, other components of a computing platform, such as a processor.

In at least some implementations, one or more portions of the herein described storage media may store signals representative of data and/or information as expressed by a particular state of the storage media. For example, an electronic signal representative of data and/or information may be "stored" in a portion of the storage media (e.g., memory) by affecting or changing the state of such portions of the storage media to represent data and/or information as binary information (e.g., ones and zeros). As such, in a particular implementation, such a change of state of the portion of the storage media to store a signal representative of data and/or information constitutes a transformation of storage media to a different state or thing.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels.

Unless specifically stated otherwise, as apparent from the following discussion, it is appreciated that throughout this specification discussions utilizing terms such as "processing," "computing," "calculating," "identifying", "determining", "establishing", "obtaining", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general-purpose computer once it is programmed to perform particular functions pursuant to instructions from program software.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in some implementations" or other like phrases in various places throughout this specification are not necessarily all referring to the same feature, example, and/or limitation. Furthermore, the particular features, structures, or characteristics may be combined in one or more examples and/or features.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method for joint motion planning and trajectory estimation, comprising:
sensing, by one or more sensors of a host vehicle, whether one or more other vehicles are in the vicinity of the host vehicle;
determining a cost function to describe system kinematics comprising trajectories, speeds, and accelerations of the host vehicle and of the one or more other vehicles in the vicinity of the host vehicle for each possible intention of the host vehicle and of the other vehicles in the vicinity of the host vehicle, wherein the trajectories are described with spline functions;
determining jointly the trajectories of the host vehicle and of the other vehicles in the vicinity of the host vehicle; and
generating control signals for the host vehicle based on the determined trajectories of the host vehicle and of the other vehicles in the vicinity of the host vehicle, wherein the control signals are used to minimize accumulated speed change.

2. The method of claim 1, wherein the cost function is based on a vehicle sensor model and/or kinematics.

3. The method of claim 1, wherein the cost function is based on a road model.

4. The method of claim 3, wherein the road model imposes a boundary distance limit.

5. The method of claim 1, wherein the control signals minimize accumulated steering angle change.

6. The method of claim 1, wherein the trajectories are represented by piecewise continuous splines.

7. A host vehicle apparatus for joint motion planning and trajectory estimation, comprising:
one or more sensors configured to detect road and vehicle parameters, including whether one or more other vehicles are in the vicinity of a host vehicle;
a memory configured to store code and data; and
a processor coupled to the memory, the processor configured to:
determine a cost function to describe system kinematics comprising trajectories, speeds, and accelerations of the host vehicle and of the one or more other vehicles in the vicinity of the host vehicle for each possible intention of the host vehicle and of the other vehicles in the vicinity of the host vehicle, wherein the trajectories are described with spline functions;
determine jointly the trajectories of the host vehicle and of the other vehicles in the vicinity of the host vehicle; and
generate control signals for the host vehicle based on the determined trajectories of the host vehicle and other vehicles within the vicinity of the host vehicle, wherein the control signals minimize accumulated speed change.

8. The host vehicle apparatus of claim 7, wherein the cost function is based on a vehicle sensor model and/or kinematics.

9. The host vehicle apparatus of claim 7, wherein the cost function is based on a road model.

10. The host vehicle apparatus of claim 9, wherein the road model imposes a boundary distance limit.

11. The host vehicle apparatus of claim 7, wherein the control signals minimize accumulated steering angle change.

12. The host vehicle apparatus of claim 7, wherein the trajectories are represented by piecewise continuous splines.

13. An apparatus for joint motion planning and trajectory estimation, comprising:
means for sensing, by one or more sensors of a host vehicle, whether one or more other vehicles are in the vicinity of the host vehicle;
means for determining a cost function to describe system kinematics comprising trajectories, speeds, and accelerations of the host vehicle and of one or more other vehicles in the vicinity of the host vehicle for each possible intention of the host vehicle and of the other vehicles in the vicinity of the host vehicle, wherein the trajectories are described with spline functions;
means for determining jointly the trajectories of the host vehicle and of the other vehicles in the vicinity of the host vehicle; and
means for generating control signals for the host vehicle based on the determined trajectories of the host vehicle and other vehicles within the vicinity of the host vehicle, wherein the control signals minimize accumulated speed change.

14. The apparatus of claim 13, wherein the cost function is based on a vehicle sensor model and/or kinematics.

15. The apparatus of claim 13, wherein the cost function is based on a road model.

16. The apparatus of claim 15, wherein the road model imposes a boundary distance limit.

17. The apparatus of claim 13, wherein the control signals minimize accumulated steering angle change.

18. The apparatus of claim 13, wherein the trajectories are represented by piecewise continuous splines.

19. A non-transitory computer-readable medium comprising code which, when executed by a processor, causes the processor to perform a method, comprising:
sensing, by one or more sensors of a host vehicle, whether one or more other vehicles are in the vicinity of the host vehicle;
determining a cost function to describe system kinematics comprising trajectories, speeds, and accelerations of the host vehicle and of one or more other vehicles in the vicinity of the host vehicle for each possible intention of the host vehicle and of the other vehicles in the vicinity of the host vehicle, wherein the trajectories are described with spline functions;
determining jointly the trajectories of the host vehicle and of the other vehicles in the vicinity of the host vehicle; and
generating control signals for the host vehicle based on the determined trajectories of the host vehicle and other vehicles within the vicinity of the host vehicle, wherein the control signals minimize accumulated speed change.

20. The non-transitory computer-readable medium of claim 19, wherein the cost function is based on a vehicle sensor model and/or kinematics.

21. The non-transitory computer-readable medium of claim 19, wherein the cost function is based on a road model.

22. The non-transitory computer-readable medium of claim 21, wherein the road model imposes a boundary distance limit.

* * * * *